United States Patent
Luo et al.

(10) Patent No.: US 10,949,535 B2
(45) Date of Patent: Mar. 16, 2021

(54) SECURITY MODEL TRAINING AND THRESHOLD SELECTION

(71) Applicant: Microsoft Technology Licensing, LLC, Redmond, WA (US)

(72) Inventors: Pengcheng Luo, Cambridge, MA (US); Reeves Hoppe Briggs, Boxborough, MA (US); Bryan Robert Jeffrey, Littleton, MA (US); Naveed Azeemi Ahmad, Medford, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 15/720,697

(22) Filed: Sep. 29, 2017

(65) Prior Publication Data

US 2019/0102554 A1  Apr. 4, 2019

(51) Int. Cl.
| | | |
|---|---|---|
| G06F 21/57 | (2013.01) | |
| G06F 21/55 | (2013.01) | |
| G06N 5/02 | (2006.01) | |
| G06F 21/56 | (2013.01) | |
| G06N 20/20 | (2019.01) | |
| G06F 21/60 | (2013.01) | |

(52) U.S. Cl.
CPC ............ G06F 21/57 (2013.01); G06F 21/552 (2013.01); G06F 21/554 (2013.01); G06F 21/566 (2013.01); G06N 5/025 (2013.01); G06N 20/20 (2019.01); *G06F 21/60* (2013.01)

(58) Field of Classification Search
CPC ........ G06F 21/57; G06F 21/552; G06F 21/60; G06N 5/025

USPC .......................................................... 726/22
See application file for complete search history.

(56) References Cited

U.S. PATENT DOCUMENTS

| | | | |
|---|---|---|---|
| 7,469,155 B2 | 12/2008 | Chu et al. | |
| 8,457,928 B2 | 6/2013 | Deng et al. | |
| 8,819,277 B2 | 8/2014 | Glowacki | |
| 9,471,457 B2 | 10/2016 | Banerjee et al. | |
| 9,690,933 B1* | 6/2017 | Singh | G06F 21/56 |
| 9,942,255 B1* | 4/2018 | MacDermed | H04L 63/1425 |
| 10,154,047 B2* | 12/2018 | Muddu | G06F 16/254 |
| 2005/0096866 A1* | 5/2005 | Shan | G06F 11/0751 |
| | | | 702/179 |

(Continued)

OTHER PUBLICATIONS

"Notification Channels: Controlling Where to Send Alerts", Retrieved From<<https://docs.newrelic.com/docs/alerts/new-relic-alerts/managing-notification-channels/notification-channels-controlling-where-send-alerts>>. Retrieved on: Aug. 10, 2017, 11 Pages.

(Continued)

*Primary Examiner* — Trong H Nguyen
*Assistant Examiner* — Moeen Khan
(74) *Attorney, Agent, or Firm* — Christopher J. Volkmann; Kelly, Holt & Christenson, PLLC

(57) ABSTRACT

A set of candidate malicious activity identification models are trained and evaluated against a production malicious activity identification model to identify a best performing model. If the best performing model is one of the candidate models, then an alert threshold is dynamically set for the best performing model, for each of a plurality of different urgency levels. A reset threshold, for each urgency level, is also dynamically set for the best performing model.

18 Claims, 8 Drawing Sheets

(56) References Cited

U.S. PATENT DOCUMENTS

| | | | |
|---|---|---|---|
| 2014/0156568 A1* | 6/2014 | Ganguly | G06Q 10/0637 706/12 |
| 2015/0033341 A1* | 1/2015 | Schmidtler | H04L 63/1425 726/23 |
| 2015/0128263 A1* | 5/2015 | Raugas | H04L 63/1408 726/23 |
| 2015/0227838 A1 | 8/2015 | Wang et al. | |
| 2016/0307180 A1 | 10/2016 | Carlson et al. | |
| 2017/0147654 A1 | 5/2017 | Saperstein et al. | |
| 2017/0149604 A1 | 5/2017 | Walker et al. | |
| 2017/0262633 A1* | 9/2017 | Miserendino | G06K 9/6282 |

OTHER PUBLICATIONS

Keilwagen, et al., "Area under Precision-Recall Curves for Weighted and Unweighted Data", In PLoS One, vol. 9, No. 3, Mar. 20, 2014, 13 Pages.

* cited by examiner

US 10,949,535 B2

SECURITY MODEL TRAINING AND THRESHOLD SELECTION

BACKGROUND

Computing systems are currently in wide use. Some computing systems include data centers or hosted services. Such systems can be the target of malicious activity. Also, such systems often have new features or functionality being added to them, so that the malicious activity may be targeted at those features or functions as well.

In order to detect malicious activity, machine learning models, that model normal and malicious activity, are often trained. Activity on a monitored computing system is then detected and the model is used to identify whether the activity is normal or possibly malicious. The output of the model may indicate whether activity is normal or malicious, and it may include a confidence score that indicates the system's confidence in the identification of the activity as being normal or malicious.

Some monitoring systems also have different levels of urgency associated with suspected malicious activity. For example, an on-call engineer or other alert responder may be identified using a paging system or another communication system when suspected activity is detected, and when the confidence score is at a relatively high level. However, when the confidence score is at a lower level, but still a high enough level to warrant an alert, the alert responder may be notified using a different alert channel, such as electronic mail or another less immediate channel. Confidence score thresholds are set for the model being used, in order to identify the level of urgency for a given alert.

In some current systems, models are promoted to the production monitoring system with a manually set threshold for the different urgency levels. The model performance is then monitored to determine whether it is sending too many false positive alerts (when the model predicts that benign activity is actually malicious), or whether the model outputting too many false negatives (when the model predicts that malicious activity is benign). These model outputs are manually observed and the confidence score thresholds are iteratively set, manually, until the model is performing as desired.

In addition, the monitored systems are often changing. The malicious activity patterns are often changing as well. Therefore, new models are trained and promoted to production in the monitoring system quite often.

The discussion above is merely provided for general background information and is not intended to be used as an aid in determining the scope of the claimed subject matter.

SUMMARY

A set of candidate malicious activity identification models are trained and evaluated against a production malicious activity identification model to identify a best performing model. If the best performing model is one of the candidate models, then an alert threshold is dynamically set for the best performing model, for each of a plurality of different urgency levels. A reset threshold, for each urgency level, is also dynamically set for the best performing model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, many monitored computing systems change often. Thus, malicious activity with respect to those computing systems also changes often. Thus, it can be difficult to train a model that is used to identify malicious activity, where the performance of the model does not degrade over time. The present discussion describes a system that automatically trains machine learned models that identify events, activities and activity patterns as being normal or malicious with respect to a monitored computing system. The present discussion also describes automatically setting alert thresholds and reset thresholds for the new models. The new models (or candidate models) are automatically evaluated, using updated test data, against a production model to identify a best performing model. If the best performing model is one of the candidate models, then its alert and reset thresholds are automatically set and it is promoted to the production monitoring system. This can be done quite often (such as every hour or more often or less often) in order to accommodate changing malicious behaviors and changing functionality in the monitored system.

Figure 1:
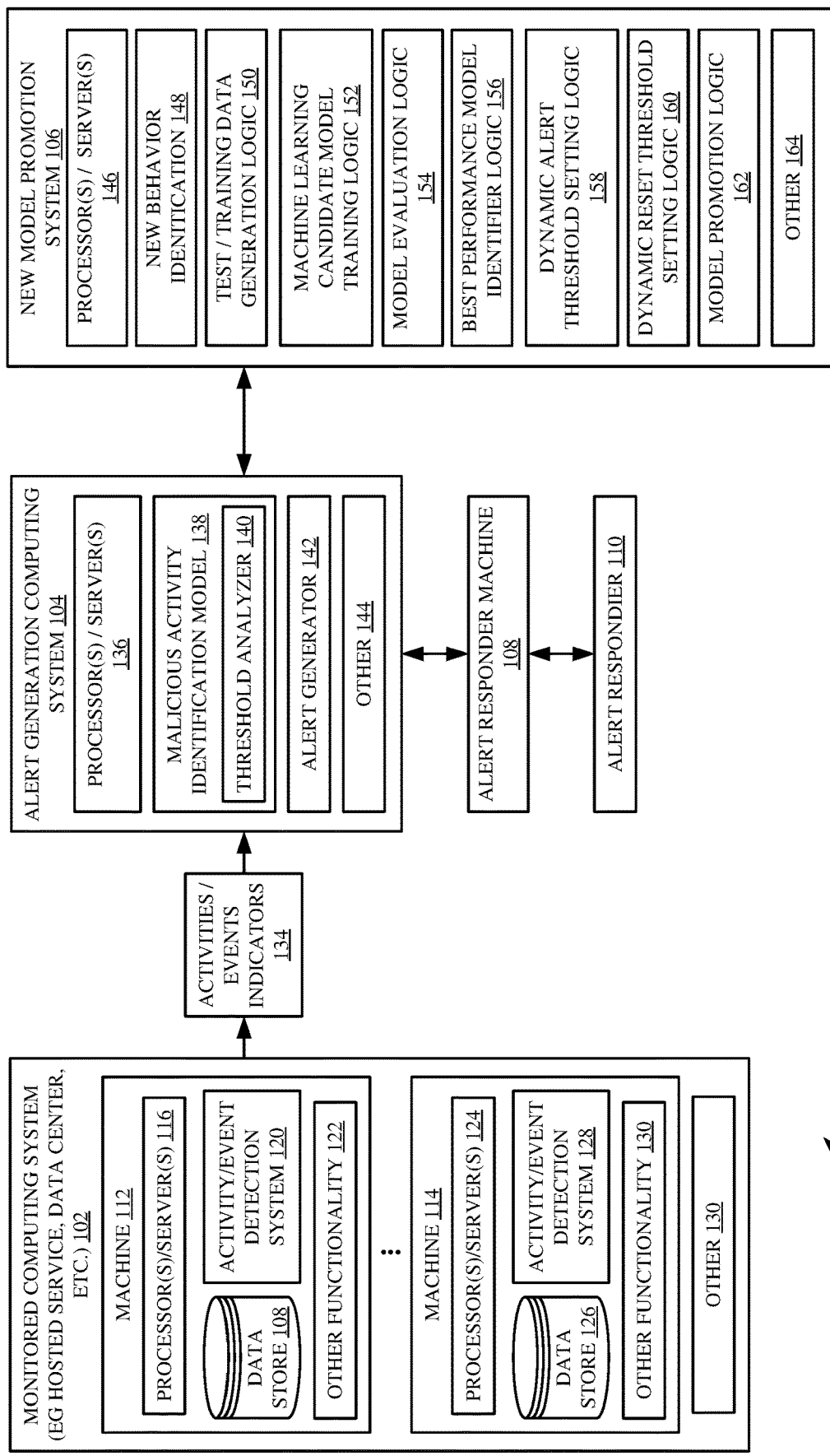
FIG. 1 is a block diagram of one example of a computing system architecture.

FIG. 1 is a block diagram showing one example of a computing system architecture 100. Computing system architecture 100 illustratively includes a monitored computing system 102 (which may be a hosted service, a data enter, etc.), alert generation computing system 104 that monitors computing system 102 and generates alerts when malicious activity is detected, and new model promotion system 106. System 106 illustratively trains and promotes new models in order to accommodate changes in the monitored computing system 102 and changes in malicious activity corresponding to that computing system.

FIG. 1 also shows that alert generation computing system 104 illustratively sends alerts to alert responder machine 108 that generates user interfaces for interaction by alert responder 110. Alert responder 110 (who may be an on-call engineer or administrative user, etc.) illustratively interacts with the user interfaces to control and manipulate alert responder machine 108, and possibly some other parts of computing system architecture 100.

Before describing the overall operation of architecture 100 in more detail, a brief overview of some of the items in architecture 100, and their operation, will first be provided. In FIG. 1, monitored computing system 102 can be a hosted service, a data center, or another computing system that may have a plurality of different machines 112-114. Machine 112 may have one or more processors or servers 116, one or more data stores 118, activity/event detection system 120, and it can include a wide variety of other functionality 122, depending on the particular type of computing system that it is deployed in. Machines 112-114 can be similar or different. In the example shown, they are similar. Therefore, machine 114 illustratively has one or more processors or servers 124, data store 126, activity/event detection system 128, and it can include a wide variety of other functionality 130. Monitored computing system 102 can also have a wide variety of other items 132.

Processors or servers 116 and 124 implement various functionality 122 and 130 to perform functions in hosting a service, in performing data center functions, or to perform other functions of the monitored computing system 102. Activity/event detection systems 120 and 128 illustratively detect activity on the particular machines 112-114 and generate activity/event indicators 134 that are indicative of the various detected events. In one example, for instance, the detected activities or events can be substantially any activities or events that a user or a remote machine takes with respect to machines 112-114, or that are taken on machines 112-114. For instance, they may be security-related events detected by an operating system running on machines 112-114. They may be a wide variety of other activities or events as well. By way of example, it may be that the systems 120 and 128 detect such things as users logging into the machines, running processes on the machines, loading software onto the machines, gaining any type of access to the machines, and once having gained access, performing any operations on the machine (such as installing and executing instructions to call out to different machines, run programs, any types of communications with other machines, etc.). In one example, the types of activities or events that are detected are those which indicate whether a user is attempting to exploit a vulnerability on the machines by gaining access to the machines and then performing some type of malicious operations, such as reconnaissance operations, data gathering operations, etc., on the machines to which access has been gained.

Alert generation computing system 104 also illustratively includes one or more processors or servers 136, malicious activity identification model 138, threshold analyzer 140, alert generator 142, and it can include a wide variety of other items 144. Malicious activity identification model 138 illustratively receives the activity/event indicators 134 and looks for patterns or related activities that might be malicious. In one example, model 138 illustratively models normal activities that are normally taken on the machines 112-114 and identifies anomalies. In another example, it not only identifies anomalies, but it may also identify patterns or activities or events that appear to be malicious in nature. In recognizing whether the events or activities indicated by indicators 134 are normal, anomalous, or even malicious, model 138 also generates a corresponding confidence score indicating how confident model 138 is in its classification or identification of the activities and events as normal, anomalous, malicious, etc. Model 138 is illustratively provided with a threshold value that indicates the urgency of an alert. For instance, if model 138 outputs an indication that a particular activity or set of activities are malicious, and it has a relatively high confidence score, then threshold analyzer 140 will determine that the confidence score exceeds the highest confidence score threshold so that the urgency level of the detected, malicious activity is high. However, if the confidence score associated with the detected, malicious activity is moderate, then threshold analyzer 140 will determine that the confidence score reaches a threshold corresponding to an intermediate threat level, or an intermediate alert urgency. If the confidence score is below a lowest threshold, threshold analyzer 140 will determine that the confidence score is so low, that no alert needs to be generated.

Threshold analyzer 140 illustratively provides a signal to alert generator 142 which indicates the type of alert (high urgency, moderate urgency, low urgency, etc.) that is to be generated relative to the detected, malicious activity. Alert generator 142 generates the alert, indicating the detected, malicious activity, and the alert level, and provides the alert over an alert channel that corresponds to the detected level of urgency. For instance, if the alert corresponds to a high level of urgency, then the alert may be generated over a paging channel where an alert responder 110 is paged, regardless of the time of day. If the alert corresponds to an intermediate or low alert level, then a different alert channel (such as e-mail) may be used to generate the alerts so that alert responder 110 can check those alerts and respond to them in due course.

In one example, the alert thresholds are also selected, per urgency level, to limit the number of false positive identifications of malicious activity associated with each alert channel. If the thresholds are set too low, then an undesirably high number of alerts are generated based on false positive detections of malicious activity. However, if the thresholds are set too high, then an undesirably large amount of malicious activity will be detected, without generating an alert. Thus, the alert threshold is set higher for the higher urgency alerts, where the alert responder will be alerted using a more immediate alerting channel (such as using a paging channel). The alert thresholds for the lower urgency level alerts may be set lower, which will increase the number of false positive alerts being generated, but those alerts will be sent over an alerting channel which reaches the alert responder in a less immediate way (such as using e-mail or another messaging system).

It can also happen that the malicious activity identification model 138 may generate an output with a confidence score that dithers or jitters around a particular alert threshold. For instance, assuming that the alert threshold for a moderate alert corresponds to a confidence score of 0.5, then the activity detected on a particular machine may fluctuate between 0.55 and 0.45, thus intermittently rising above the alert threshold and falling below the alert threshold. This can lead to threshold analyzer 140 generating a signal to alert generator 142 requesting alert generator 142 to generate multiple different alerts for the same machine, and for similar malicious activity.

Therefore, in one example, threshold analyzer 140 is also provided with a reset threshold for each alert urgency level where the reset threshold is below the alert threshold. By way of example, assume that the alert threshold for an alert with an intermediate urgency level is 0.5. Assume also that model 138 will output an indication that malicious activity has been detected on that machine when it is detected with a confidence score of 0.50 or more. When this occurs, model 138 sets an alert status for the corresponding machine indicating that the machine is experiencing malicious activity that corresponds to an intermediate alert level. If the confidence score for the detected activity on that machine subsequently falls below 0.5, and rises above 0.5 again, a subsequent alert is not generated, unless, in the meantime, the confidence score for the activity falls below the reset threshold (for example 0.40). If it does fall below the reset threshold, then the alert status for the machine is reset indicating that the malicious activity is no longer being detected and that the alert does not need an immediate response. Thus, in one example, it can be seen that threshold analyzer 140 not only analyzes the output of model 138 against an alert threshold or set of alert thresholds (corresponding to different urgency levels), but also with respect to a reset threshold (or a set of reset thresholds, one corresponding to each urgency level). The output of alert generation computing system 104, to the alert responder machine 108 (through the appropriate alert channel) thus indicates the type of malicious activity that was detected, the type of alert that was generated, and the level of urgency level corresponding to the alert.

It will also be noted that the alert status can be set and reset for any scope (in monitored computing system 102) that model 138 determines to be affected by the malicious activity. It can be set and reset (as discussed above) for individual physical machines, for groups of machines, for virtual scopes or for other scopes.

It is not uncommon for the functionality provided by monitored computing system 102 to change, and even to change relatively frequently. To accommodate these types of changes in an environment, new model promotion system 106 illustratively trains new candidate models relatively frequently, based upon new training data that is updated to accommodate the changes to computing system 102, and changes to the types of malicious activity that might be detected on computing system 102. It also illustratively automatically, and dynamically, identifies new alert thresholds and reset thresholds for the corresponding candidate models and evaluates those candidate models against malicious activity identification model 138 that is currently being used by alert generation system 104. If any of the candidate models performs better than the current (or production) model 138 being used by alert generation computing system 104, then that candidate model is promoted to computing system 104 and is used instead of model 138.

Thus, in one example, new model promotion system 106 can include one or more processors or servers 146, new behavior identification logic 148, test/training data generation logic 150, machine learning candidate model training logic 152, model evaluation logic 154, best performing model identifier logic 156, dynamic alert threshold setting logic 158, dynamic reset threshold setting logic 160, model promotion logic 162, and it can include a wide variety of other items 164. New behavior identification logic 148 illustratively identifies when any new features or functionality has been deployed to system 102, or when new malicious activity has been detected, or when the possibility of that malicious activity occurs. Therefore, in one example, new behavior identification logic 148 determines that new malicious activity behavior is to be modeled periodically (such as every hour or more or less frequently). It can also identify when new behavior needs to be modeled based upon an indication that new features have been deployed to system 102, based upon an indication that new types of malicious activity patterns have been identified, or in other ways.

Test/training data generation logic 150 then determines when new test or training data needs to be generated. Again, for instance, when new features are deployed to system 102, or when new malicious activity has been detected, or when different types of behavioral patterns have been detected that are not adequately represented in the test or training data, then test/training data generation logic 150 illustratively generates test and training data corresponding to the new behavior or the new features in system 102.

Machine learning candidate model training logic 152 then trains one or more different candidate models using the new training data (or training data that is augmented with the newly generated training data). In one example, where multiple different candidate models are trained at the same time, then different training algorithms can be used to train those models. In another example, different sets of training data can be used to train the different candidate models. These are examples and other ways of training candidate models can be used as well.

Once the candidate models are trained, model evaluation logic 154 illustratively runs those models against test data. It also illustratively runs the malicious activity identification model 138 currently being used in production by alert generation computing system 104 against the test data as well. Each of the models that are evaluated illustratively generate outputs that may have a different accuracy level. For instance, one of the candidate models may identify malicious activity in the test data more accurately than the production model 138. A metric indicative of the level of accuracy of detection, for each model, is identified by model evaluation logic 154.

Best performing model identifier logic 156 then identifies the best performing model, among those evaluated by evaluation logic 154. The best performing model may be a model that identifies most malicious activity or that identifies malicious activity most accurately. It may be a model that identifies malicious activity with the most accurate confidence values. It may be identified as the best in other ways as well.

If the best performing model is one of the candidate models, instead of the model 138 currently being used by alert generation computing system 104, then dynamic alert threshold setting logic 158 and dynamic reset threshold setting logic 160 dynamically identify and set the alert thresholds and reset thresholds, for each urgency level, for the candidate model (if they are not already set). Model promotion logic 162 then promotes the candidate model, with the dynamically set thresholds, to alert generation computing system 104, where it can be used instead of model 138.

Figure 2A:
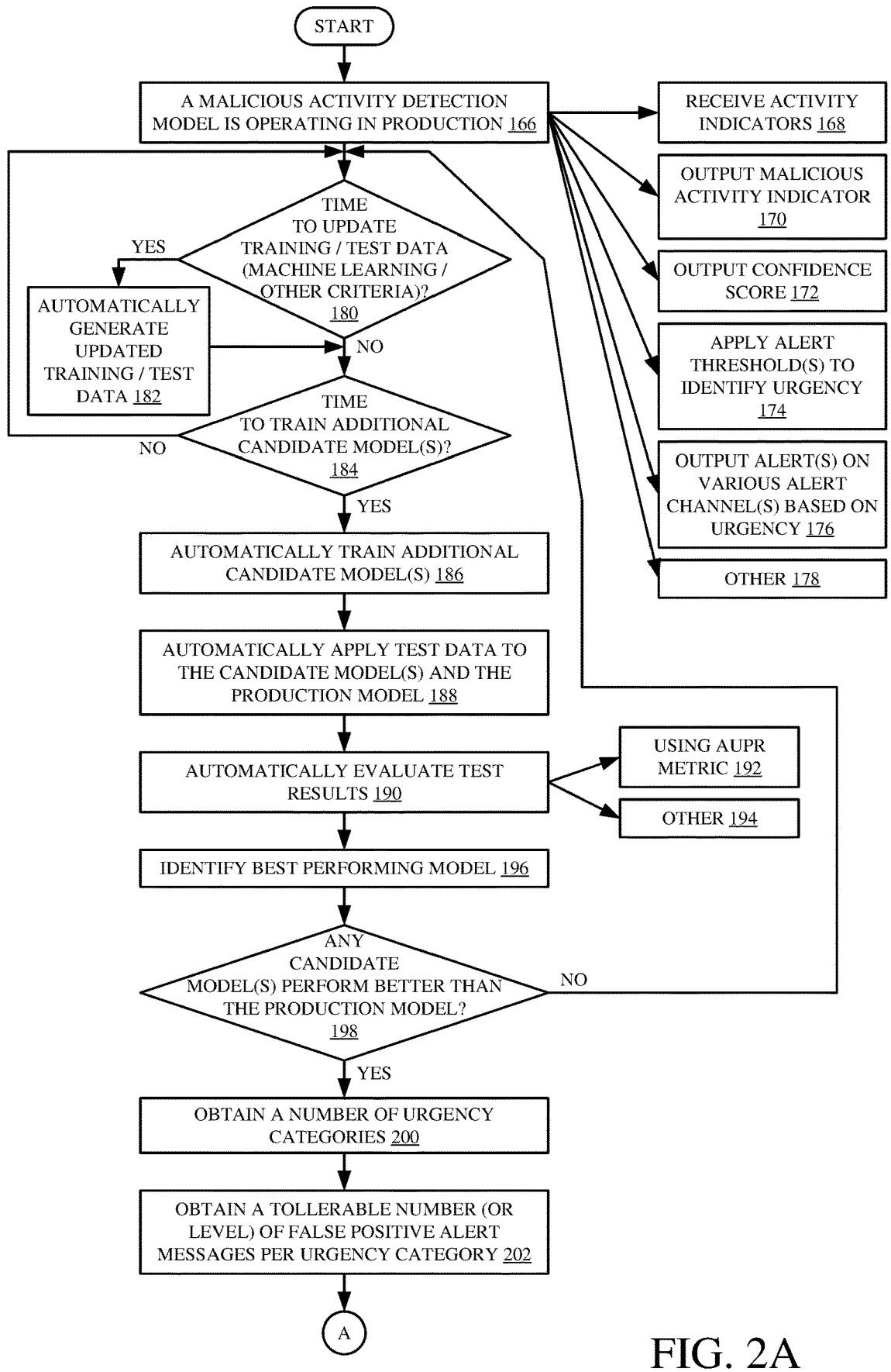
FIGS. 2A and 2B (collectively referred to herein as FIG. 2) illustrate the operation of the architecture shown in FIG. 1 in training and promoting a malicious activity identification model, and in automatically and dynamically setting an alert threshold and a reset threshold for each of a plurality of different urgency levels.
Figure 2B:
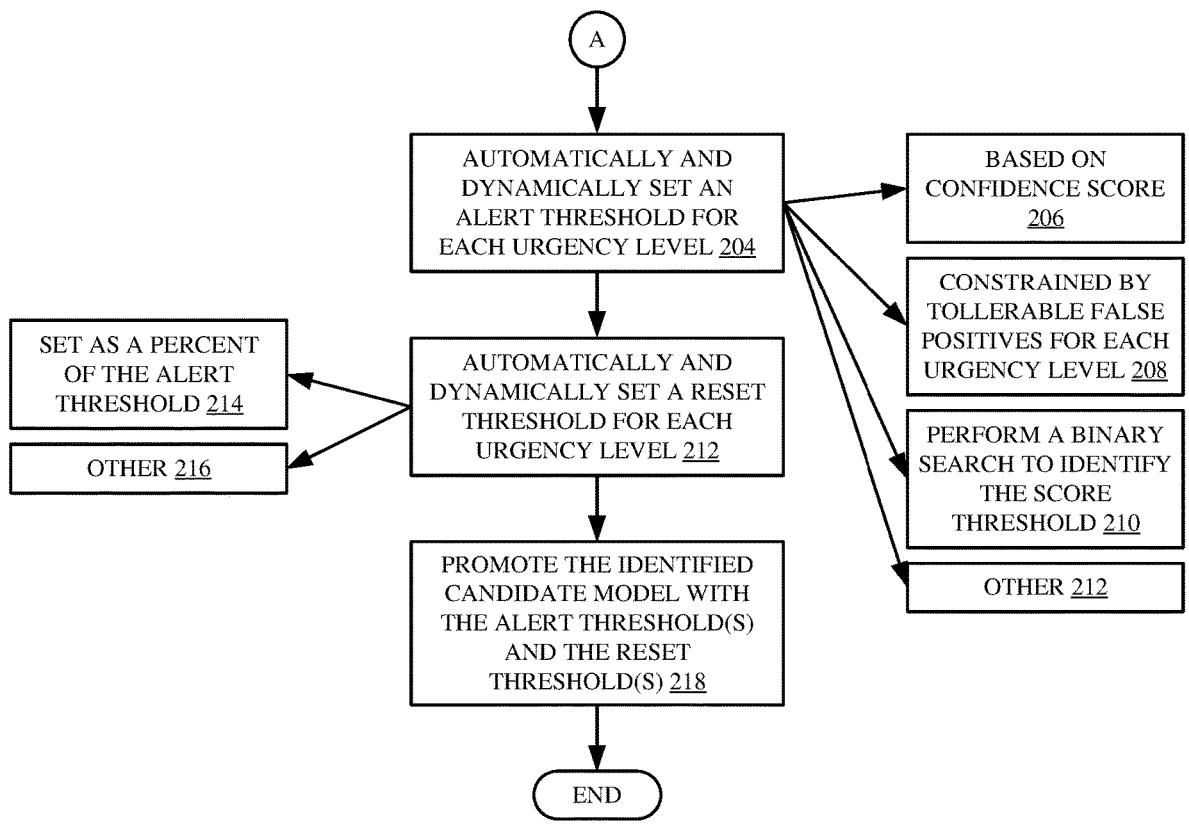

FIGS. 2A and 2B (collectively referred to herein as FIG. 2) show a flow diagram illustrating one example of the operation of the architecture illustrated in FIG. 1, in training candidate models, identifying a best performing model and promoting that model to the production environment of alert generation computing system 104. It is first assumed that a malicious activity identification model (such as model 138 in FIG. 1) is deployed in an alert generation computing system to identify malicious activity and output a confidence level associated with each set of malicious activity identified. This is indicated by block 166 in the flow diagram of FIG. 2. In performing its operation, it illustratively receives activity or event indicators 134 from a monitored computing system 102. This is indicated by block 168. It also outputs a malicious activity indicator, along with a corresponding confidence score, when malicious activity is detected. This is indicated by blocks 170 and 172 in the flow diagram of FIG. 2. It can apply alert thresholds to the confidence score, to identify the particular urgency level that the malicious activity should be associated with. This is indicated by block 174. It also illustratively applies the reset thresholds corresponding to those urgency levels as well. The alert generation computing system 104 illustratively outputs alerts on various alert channels, based upon the urgency level corresponding to those alerts. This is indicated by block 176. The malicious activity detection model can be used in other ways as well, and this is indicated by block 178.

At some point, new behavior identification logic 148 and test/training data generation logic 150 will determine that it is time to update the training and test data used in training and testing candidate models which may be used to replace model 138. This is done using a machine learning algorithm, or it can be determined based on other criteria (such as whether system 102 has been updated, such as whether different types of malicious activity patterns have been detected, etc.). Determining whether it is time to update the training and test data is indicated by block 180 in the flow diagram of FIG. 2. If so, then test/training data generation logic 150 automatically generates updated training and test data for use in training and testing the candidate models. This is indicated by block 182. The training and test data can be entirely new training and test data which is generated from newly detected activity patterns on monitored computing system 102. The training and test data can be augmented training and test data where newly identified behavior or activity and event patterns have been detected and data indicative of that newly detected behavior or events can be added to existing training and test data. In one example, the new data may be weighted more heavily, because it is more recent. These are only examples of how the new training and test data can be generated.

Machine learning candidate model training logic 152 also determines whether it is time to train candidate models which may possibly replace model 138. This is indicated by block 184. This can also be done in a variety of different ways, and based on different criteria. For instance, as new behaviors are detected on monitored computing system 102, and as new features or functionality is added to monitored computing system 102, then the prediction capability of malicious activity identification model 138 may degrade over time. Thus, in one example, machine learning candidate model training logic 152 determines that new candidate models need to be trained based on an amount of elapsed time since they were last trained. Also, it can determine whether it is time to train candidate models based upon the level of new activity or behavior that has been detected on computing system 102, or the amount of new features or functionality that has been added to computing system 102. It can also be configured to continuously train new models, based upon new training and test data, or based upon behavior patterns detected at computing system 102. These and/or other criteria or algorithms can be used to determine whether it is time to train candidate models. If not, processing reverts to block 180 where the training and test data may be updated.

However, if, at block 184, machine learning candidate model training logic 152 determines that it is time to train candidate models, then it automatically trains one or more additional candidate models based upon the available training data. This is indicated by block 186. The particular training mechanism that is used can be any of a wide variety of different training mechanisms, depending on the particular malicious activity which it is to detect, depending on the type of monitored computing system 102, etc.

Once the machine learning logic 152 trains the new candidate models, then model evaluation logic 154 uses the test data to evaluate the performance of the candidate models relative to the performance of the production model 138 that is currently being used by alert generation computing system 104. Automatically applying the test data to the candidate models and the production model is indicated by block 188 in the flow diagram of FIG. 2. Automatically evaluating the test results is indicated by block 190.

The techniques or metrics used to evaluate the test results can vary widely. In one example, the evaluation of the test results is performed using a technique that identifies the area under precision and recall (AUPR) curves. For instance, each of the candidate models and the production model may identify different numbers of possibly malicious activity, given the test data. The greater the number of actual malicious test data that is detected, the greater will be the recall metric corresponding to that model. However, the models may also have different levels of precision. By way of example, although a model may detect a very high number of actual malicious activities in the test data, it may also generate a relatively high number of false positive outputs where it identified benign activity as being malicious. Thus, the precision metric corresponding to that model will be relatively low. Thus, in using the AUPR metric, model evaluation logic 154 generates an output which is a measure indicative of how each model performed with respect to both precision and recall. Using the AUPR metric to evaluate the models is indicated by block 192. It will be appreciated, though, that this is just one example and the models may be evaluated using a wide variety of other metrics as well. This is indicated by block 194.

Best performing model identifier logic 156 then identifies the best performing model according to the evaluation criteria generated by model evaluation logic 154. This is indicated by block 196. If the production model 138 that is currently being used by alert generation computing system 104 performed as well as, or better than, the candidate models, then processing reverts to block 180. Determining whether any of the candidate models performed better than the production model is indicated by block 198.

If, at block 198, it is determined that one of the candidate models actually performed better than the production model 138 currently being used by alert generation computing system 104, then, if it has not already done so, the system automatically sets the alert and reset thresholds. Thus, if it does not already have them, dynamic alert threshold setting logic 158 obtains a number of urgency categories for which alert thresholds are to be set. It also obtains a tolerable number (or other measure) of false positive alert messages that may be accepted in each urgency category. Obtaining the number of urgency categories is indicated by block 200 and obtaining the number or measure of false positive alert messages for each category is indicated by block 202. Dynamic alert threshold setting logic 158 then automatically and dynamically sets an alert threshold for each urgency level. This is indicated by block 204. This is illustratively done based upon the confidence score generated by the model. This is indicated by block 206.

In one example, dynamic alert threshold setting logic 158 uses an approximation algorithm to dynamically set a threshold for multi-urgency alert levels, with the constraints being the number of allowable false positives for each alert level. By way of example only, the allowable false positives for an urgent alert may be one per day, while the allowable false positives for a non-urgent alert (or an alert having a lower urgency level) may be ten per day. Using an approximation algorithm constrained by the tolerable false positives for each urgency level is indicated by block 208.

In one example, the approximation algorithm rescores the training data and, for each urgency level, performs a binary search to find a confidence score threshold which produces no more than the allowable number of false positives for that urgency level. Performing a binary search to identify the confidence score threshold for a given urgency level is indicated by block 210. The alert thresholds can be identified in other ways as well, and this is indicated by block 211.

Dynamic reset threshold setting logic 160 then dynamically and automatically identifies a reset threshold for each urgency level. This is indicated by block 212. In order to address the issue of redundant alerts, as discussed above, the reset threshold is set below the alert threshold in each urgency level. In one example, it is set as a percent of the alert threshold. This is indicated by block 214. For example, it can be set at 80% of the alert threshold. It will be appreciated, however, that the reset threshold can be dynamically and automatically set in a wide variety of other ways as well. For instance, it may be set at a different percent of the alert threshold for different urgency levels. It may be set in different ways, depending on the particular type of malicious activity detected. It can be set in a wide variety of other ways as well, and this is indicated by block 216.

Once the new candidate model has its alert thresholds and reset thresholds set, it is promoted (e.g, deployed) to the alert generation computing system 104. This is indicated by block 218.

It can thus be seen that the present description improves the alert generation computing system 104 in a variety of different ways. It automatically trains candidate models to replace the existing production model 138, but it only does so if the candidate models perform better than the existing production model. It does this using machine learning processes to accommodate for changes in the monitored computing system 102, and for changes in the types of malicious activity being detected. It automatically sets not only alert thresholds but reset thresholds so that computing system 104 will instantly generate results of a desired quality. As soon as the new model is deployed in computing system 104, the system will only generate false positive alerts, at different urgency levels, at an acceptable level. There is no longer a need to allow the system to generate false positives at an undesirable level, and then change the thresholds, iteratively, until the system is performing as desired. Instead, the system will perform as desired as soon as the new model is promoted to the system. This improves the accuracy of the alert generation computing system 104, and it also improves the speed at which that accuracy is obtained.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays may have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 3:
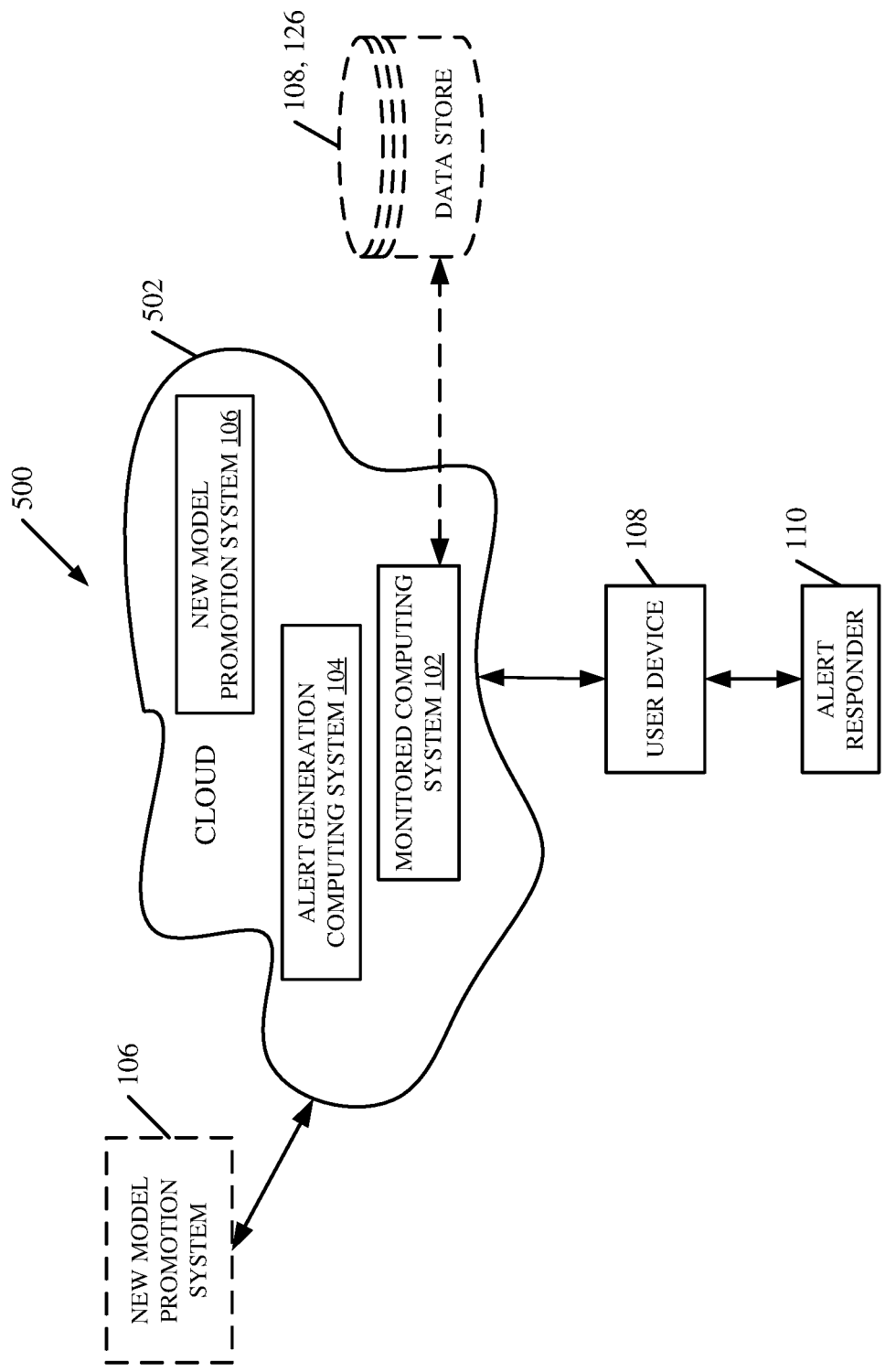
FIG. 3 is a block diagram showing one example of the architecture illustrated in FIG. 1, deployed in a cloud computing architecture.

FIG. 3 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 3, some items are similar to those shown in FIG. 1 and they are similarly numbered. FIG. 3 specifically shows that monitored computing system 102, alert generation computing system 104 and new model promotion system 106 can be located in cloud 502 (which can be public, private, or a combination where portions are public while others are private). Therefore, alert responder 108 uses a user device (or responder system) 108 to access any of those systems through cloud 502.

FIG. 3 also depicts another example of a cloud architecture. FIG. 3 shows that it is also contemplated that some elements of computing systems 102, 104 or 106 or those systems themselves, can be disposed in cloud 502 while others are not. By way of example, data stores 108, 126 can be disposed outside of cloud 502, and accessed through cloud 502. In another example, new model promotion system 106 (or other items) can be outside of cloud 502. Regardless of where they are located, they can be accessed directly by one another and/or device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 4:
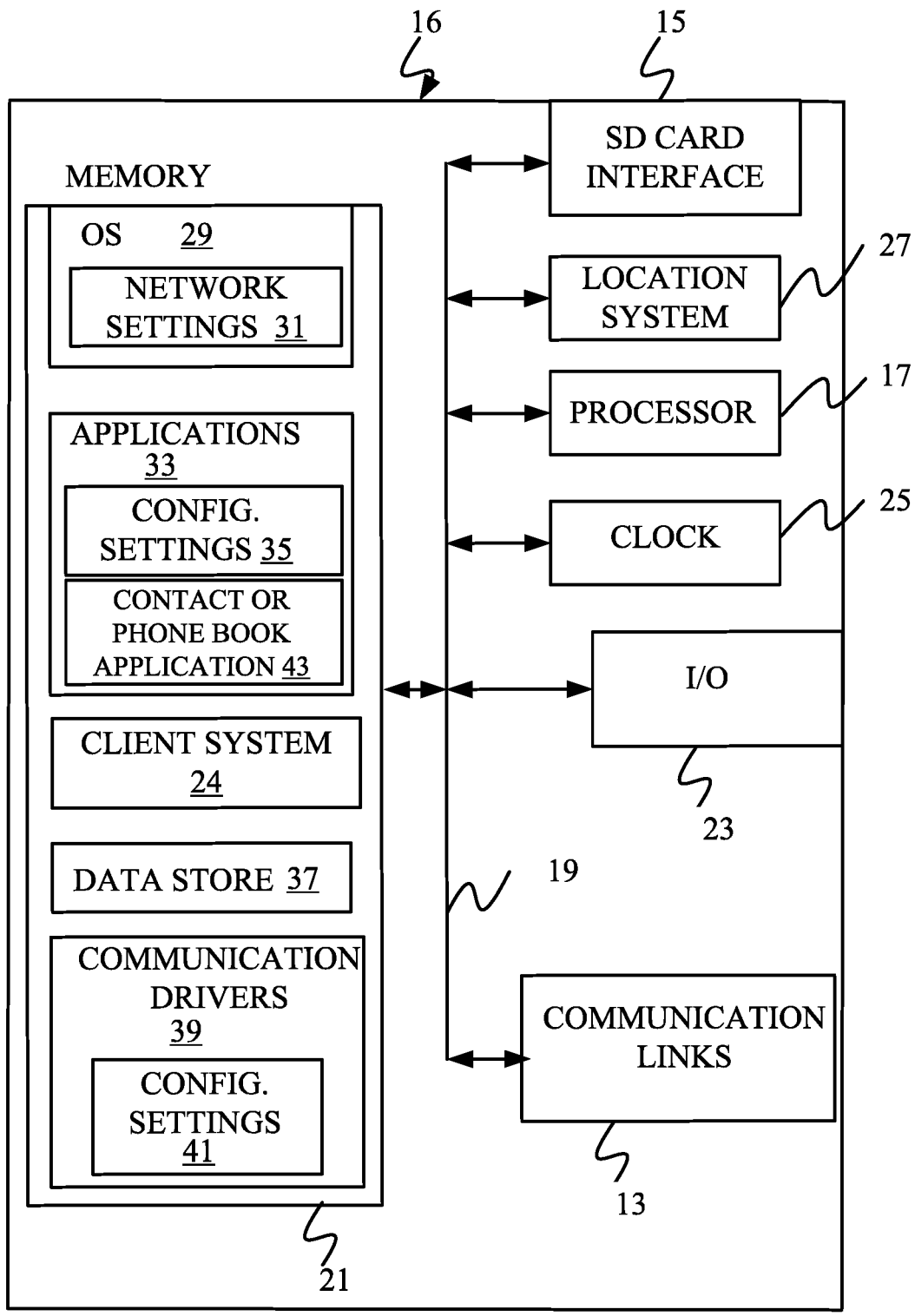
FIGS. 4-6 show examples of mobile devices that can be used in the architectures shown in the previous figures.
Figure 5:
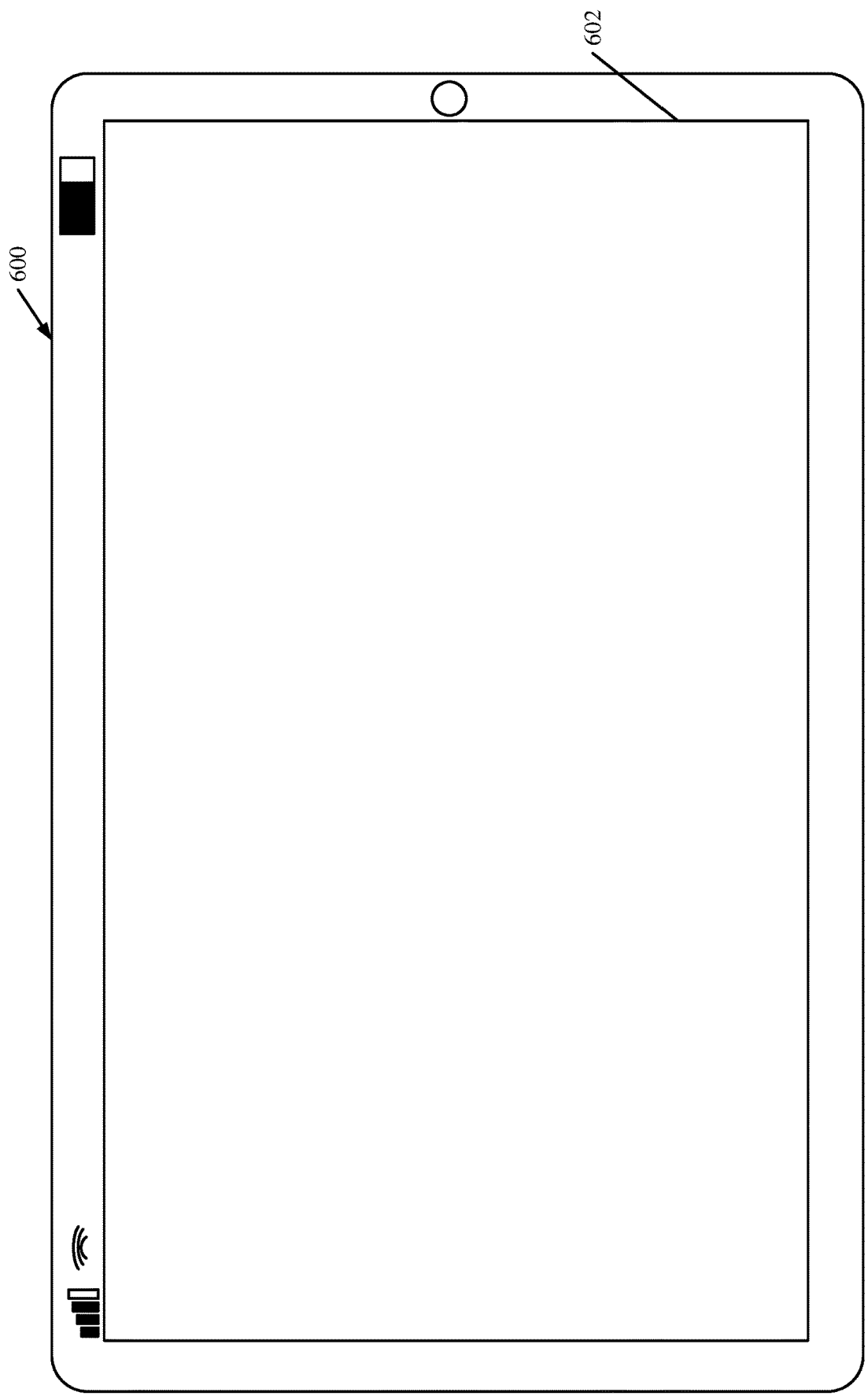
Figure 6:
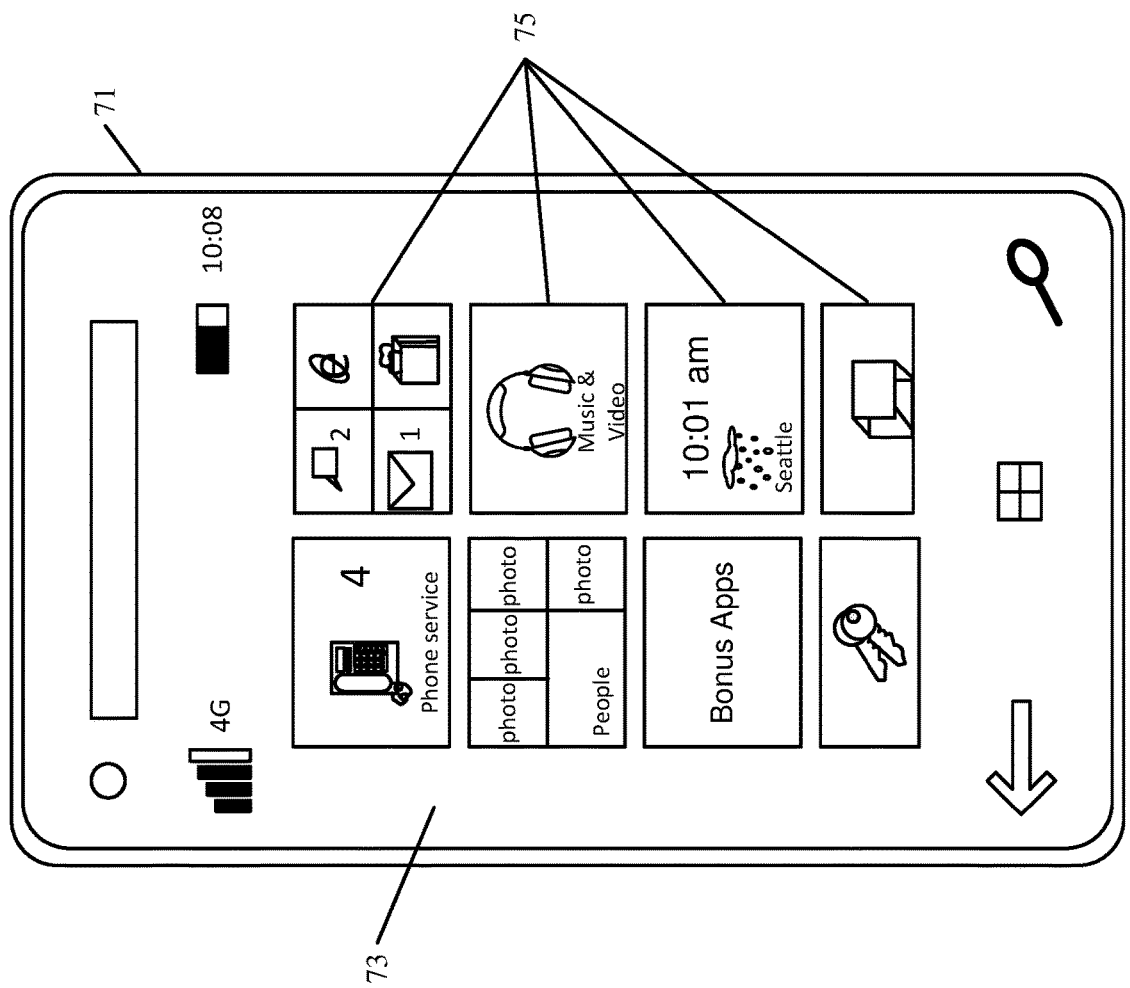

FIG. 4 is a simplified block diagram of one illustrative example of a handheld or mobile computing device that can be used as a user's or client's hand held device 16, in which the present system (or parts of it) can be deployed. FIGS. 5-6 are examples of handheld or mobile devices.

FIG. 4 provides a general block diagram of the components of a client device 16 that can run components computing systems 102, 104 and/or 106 or user device 108 or that interacts with architecture 100, or all of these things. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one examples, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 5 shows one example in which device 16 is a tablet computer 600. In FIG. 5, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 6 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 7:
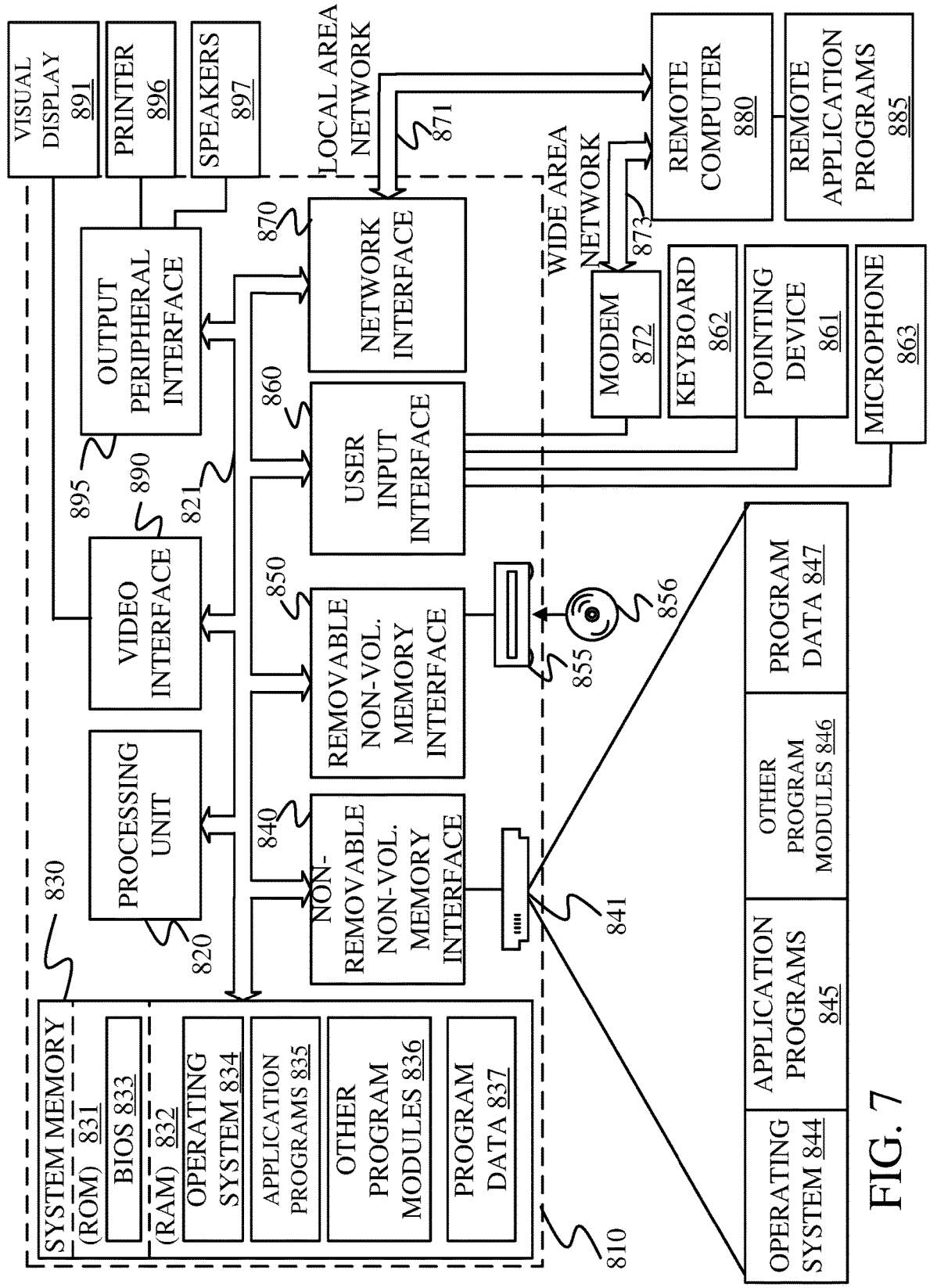
FIG. 7 is a block diagram showing one example of a computing environment that can be used in the architectures shown in the previous figures.

FIG. 7 is one example of a computing environment in which architecture 100, or parts of it, (for example) can be deployed. With reference to FIG. 7, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

model training logic that automatically trains a set of candidate models to identify malicious activity in a monitored computing system based on activity indicators obtained from the monitored computing system;

model evaluation logic that automatically evaluates a performance of each of the candidate models and a production model used by an alert generation computing system, based on a set of test data, and that generates a performance metric corresponding to each candidate model and corresponding to the production model; and model promotion logic that automatically deploys a best performing model, based on the corresponding performance metrics, to the alert generation computing system.

Example 2 is the computing system of any or all previous examples wherein the candidate models and the production model are each configured to receive input activity data indicative of activities and generate an output indicative of whether the model has determined that the input activity data represents malicious activity and an associated confidence score indicative of a confidence that the model has in the determination that the input activity data represents malicious activity.

Example 3 is the computing system of any or all previous examples wherein the model training logic is configured to train the candidate models to identify malicious activity and a corresponding urgency level, of a plurality of different urgency levels, the corresponding urgency level being identified by comparing the confidence score associated with the malicious activity to an alert threshold for the urgency level.

Example 4 is the computing system of any or all previous examples and further comprising:

dynamic alert threshold setting logic configured to automatically configure each candidate model to set a corresponding alert threshold for each urgency level.

Example 5 is the computing system of any or all previous examples wherein the dynamic alert threshold setting logic configures the candidate models to set the alert threshold for each urgency level by identifying a confidence score, above which the model generates no more than a first predefined number of false positive outputs that identify input activity test data, that represents benign activity, as representing malicious activity.

Example 6 is the computing system of any or all previous examples wherein the dynamic alert threshold setting logic configures the candidate models to set the alert threshold for each urgency level by performing a binary search of confidence scores to identify the confidence score, above which the model generates no more than a first predefined number of false positive outputs that identify input activity test data, that represents benign activity, as representing malicious activity.

Example 7 is the computing system of any or all previous examples wherein the model training logic is configured to train the candidate models to identify a scope of the monitored computing system as being affected by the malicious activity and, when the confidence score meets an alert threshold for an urgency level, an alert status of the corresponding scope is set to an alert level for the malicious activity and when the confidence score drops below a reset threshold, that is below the alert threshold, the alert status for the scope is reset to an un-alerted level.

Example 8 is the computing system of any or all previous examples and further comprising:

dynamic reset threshold setting logic configured to automatically configure each candidate model to set a corresponding reset threshold for each urgency level.

Example 9 is the computing system of any or all previous examples wherein the dynamic reset threshold setting logic configures the candidate models to set the reset threshold, for each corresponding urgency level, to be a percent of the alert threshold for the corresponding urgency level.

Example 10 is a computer implemented method, comprising:

automatically identifying a set of training data and test data that represent malicious activity and benign activity on a computing system;

automatically training a set of candidate models, with the training data, to identify malicious activity in a monitored computing system based on activity indicators obtained from the monitored computing system;

automatically evaluating a performance of each of the candidate models and a production model used by an alert generation computing system, based on the test data, and based on a performance metric corresponding to each candidate model and corresponding to the production model; and automatically deploying a best performing model, based on the corresponding performance metrics, to the alert generation computing system.

Example 11 is the computer implemented method of any or all previous examples wherein automatically training comprises:

automatically training the candidate models and the production model to receive input activity data indicative of activities and to generate an output indicative of whether the model has determined that the input activity data represents malicious activity and an associated confidence score indicative of a confidence that the model has in the determination that the input activity data represents malicious activity.

Example 12 is the computer implemented method of any or all previous examples wherein automatically training comprises:

automatically training the candidate models to identify malicious activity;

comparing the confidence score associated with the malicious activity to an alert threshold for an urgency level; and assigning the malicious activity to the urgency level, of a plurality of different urgency levels, corresponding to the alert threshold.

Example 13 is the computer implemented method of any or all previous examples and further comprising:

automatically configuring each candidate model to set a corresponding alert threshold for each urgency level.

Example 14 is the computer implemented method of any or all previous examples wherein automatically configuring each candidate model to set a corresponding alert threshold for each urgency level comprises:

identifying a confidence score, above which the model generates no more than a predefined number of false positive outputs that identify input activity test data, that represents benign activity, as representing malicious activity.

Example 15 is the computer implemented method of any or all previous examples wherein configuring each candidate model to set an alert threshold for each urgency level comprises identifying a confidence score corresponding to each urgency level, above which the model generates no more than a predefined number of false positive outputs, the predefined number of false positive outputs being different for each urgency level.

Example 16 is the computer implemented method of any or all previous examples wherein identifying a confidence score corresponding to each urgency level comprises:

performing a binary search of confidence scores to identify the confidence score, above which the model generates no more than the predefined number of false positive outputs that identify input activity test data, that represents benign activity, as representing malicious activity.

Example 17 is the computer implemented method of any or all previous examples wherein automatically training a set of candidate models comprises training the candidate models to identify a scope of the monitored computing system as being affected by the malicious activity and, when the confidence score meets an alert threshold for an urgency level, to set an alert status of the corresponding scope to an alert level for the malicious activity and when the confidence score drops below a reset threshold, that is below the alert threshold, to reset the alert status for the scope to an un-alerted level, and further comprising:

automatically configuring each candidate model to set a corresponding reset threshold for each urgency level.

Example 18 is the computer implemented method of any or all previous examples wherein automatically configuring the candidate models to set a corresponding reset threshold comprises:

automatically configuring each candidate model to set the reset threshold, for each corresponding urgency level, to be a percent of the alert threshold for the corresponding urgency level.

Example 19 is a computing system, comprising:

model training logic that automatically trains a set of candidate models to identify malicious activity in a monitored computing system based on activity indicators obtained from the monitored computing system, the candidate models and a production model used by an alert generation computing system each being configured to receive input activity data indicative of activities and generate an output indicative of whether the model has determined that the input activity data represents malicious activity and an associated confidence score indicative of a confidence that the model has in the determination that the input activity data represents malicious activity, and to assign the malicious activity to an urgency level by comparing the confidence score associated with the malicious activity to an alert threshold for the urgency level;

dynamic alert threshold setting logic configured to automatically configure each candidate model to set a corresponding alert threshold for each urgency level;

model evaluation logic that automatically evaluates a performance of each of the candidate models and the production model, based on a set of test data, and that generates a performance metric indicative of the performance of each candidate model and the production model; and model promotion logic that automatically deploys a best performing model, based on the corresponding performance metrics, to the alert generation computing system.

Example 20 is the computing system of any or all previous examples wherein the model training logic is configured to train the candidate models to identify a scope of the monitored computing system as being affected by the malicious activity and, when the confidence score meets an alert threshold for an urgency level, an alert status of the corresponding scope is set to an alert level for the malicious activity and when the confidence score drops below a reset threshold, that is below the alert threshold, the alert status for the scope is reset to an un-alerted level, and further comprising:

dynamic reset threshold setting logic configured to automatically configure each candidate model to set a corresponding reset threshold for each urgency level.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one processor; and
   memory storing instructions executable by the at least one processor, wherein the instructions, when executed, cause the computing system to:
   based on training data, automatically train a candidate model to:
     receive input activity data indicative of computing activity;
     generate a confidence score indicative of a confidence that the input activity data represents malicious activity;
     compare the confidence score to respective alert thresholds corresponding to a plurality of different urgency levels associated with the candidate model, wherein each urgency level is associated with a particular alert channel of a plurality of different alert channels;
     select one of the plurality of different urgency levels based on the comparison;
     select one of the alert channels based on the selected urgency level;
     generate an output that is indicative of a determination that the input activity data represents malicious activity and indicative of the confidence score; and
     send an alert representing the output using the selected alert channel;
   automatically set the respective alert thresholds corresponding to the plurality of different urgency levels based on the training data;
   identify a current production model currently deployed by an alert generation computing system in a runtime production environment,
     the current production model configured to generate an alert output indicating that activity data represents malicious activity in the runtime production environment and representing a confidence score indicative of a confidence that the activity data represents malicious activity;
   generate a current model performance metric that represents performance of the current production model in identifying malicious activity based on test data;
   generate a candidate model performance metric that represents performance of the candidate model in identifying malicious activity based on test data;
   select a best performing model based on the current model performance metric and the candidate model performance metric; and automatically deploy the best performing model to the alert generation computing system in the runtime production environment.

2. The computing system of claim 1 wherein the instructions cause the computing system to:
set, for the candidate model, the corresponding alert threshold for each urgency level by identifying a particular confidence score, above which the candidate model generates no more than a first predefined number of false positive outputs that identify input activity test data, that represents benign activity, as representing malicious activity.

3. The computing system of claim 1 wherein the instructions cause the computing system to configure the candidate model to set the corresponding alert threshold for each given urgency level by:
identifying an allowable number of false positive outputs for the given urgency level;
identifying a confidence score threshold which produces no more than the allowable number of false positive outputs for the given urgency level based on a binary search of confidence scores.

4. The computing system of claim 1 wherein the instructions cause the computing system to train the candidate model to identify a scope of a monitored computing system as being affected by given malicious activity and, when a given confidence score meets a particular alert threshold for a particular urgency level, an alert status of the corresponding scope is set to an alert level for the given malicious activity and when the given confidence score drops below a reset threshold, that is below the alert threshold, the alert status for the scope is reset to an un-alerted level.

5. The computing system of claim 4 wherein the instructions cause the computing system to:
automatically configure the candidate model to set a corresponding reset threshold for each urgency level.

6. The computing system of claim 5 wherein the instructions cause the computing system to configure the candidate model to set the reset threshold, for each corresponding urgency level, to be a percent of the alert threshold for the corresponding urgency level.

7. A computer implemented method, comprising:
based on training data that represents malicious and benign computing activity, automatically training a set of candidate models to identify malicious activity in a monitored computing system based on activity indicators obtained from the monitored computing system;
based on test data that represents malicious and benign computing activity, automatically evaluating performance of each candidate model, of the set of candidate models, in identifying malicious activity;
generating a candidate model performance metric corresponding to each candidate model based on the evaluation of each candidate model;
selecting one of the candidate models based on the candidate model performance metrics, wherein the selected candidate model is configured to:
generate a confidence score indicative of a confidence that input activity data represents malicious activity, and
compare the confidence score to respective alert thresholds corresponding to a plurality of different urgency levels associated with the selected candidate model, based on the comparison, select one of the plurality of different urgency levels, and
assign a malicious activity to the selected urgency level;
automatically setting the respective alert thresholds of the selected candidate model by:
for each particular urgency level of the plurality of different urgency levels,
identifying an allowable number of false positive outputs for the particular urgency level, and
identifying a confidence score threshold which produces no more than the allowable number of false positive outputs for the particular urgency level based on a binary search of confidence scores; and
automatically deploying the selected candidate model to the alert generation computing system.

8. The computer implemented method of claim 7 wherein automatically training comprises:
automatically training each model, of the set of candidate models and a production model, to receive input activity data indicative of activities and to generate an output indicative of whether each model has determined that the input activity data indicative of activities represents malicious activity and an associated confidence score indicative of a confidence that each model has in the determination that the input activity indicative of activities data represents malicious activity.

9. The computer implemented method of claim 7, wherein each urgency level is associated with a particular alert channel.

10. The computer implemented method of claim 7, wherein a plurality of different alert channels are associated with the urgency levels, and further comprising:
selecting a particular alert channel based on the selected urgency level; and
sending an alert indicating detected malicious activity using the particular alert channel.

11. The computer implemented method of claim 10 wherein automatically configuring each candidate model to set a corresponding alert threshold for each urgency level comprises:
identifying a particular confidence score, above which each candidate model generates no more than a predefined number of false positive outputs that identify input activity test data, that represents benign activity, as representing malicious activity.

12. The computer implemented method of claim 11 wherein configuring each candidate model to set the corresponding alert threshold for each urgency level comprises
identifying a particular confidence score corresponding to each urgency level, above which each candidate model generates no more than the predefined number of false positive outputs, the predefined number of false positive outputs being different for each urgency level.

13. The computer implemented method of claim 12 wherein automatically training the set of candidate models comprises training the set of candidate models to identify a scope of the monitored computing system as being affected by given malicious activity and, when the confidence score meets a particular alert threshold for a particular urgency level, to set an alert status of the corresponding scope to an alert level for the given malicious activity and when the confidence score drops below a reset threshold, that is below the alert threshold, to reset the alert status for the scope to an un-alerted level, and further comprising:
automatically configuring each candidate model to set a corresponding reset threshold for each urgency level.

14. The computer implemented method of claim 13 wherein automatically configuring the set of candidate models to set a corresponding reset threshold comprises:

automatically configuring each candidate model to set the reset threshold, for each corresponding urgency level, to be a percent of the alert threshold for the corresponding urgency level.

15. A computer implemented method comprising:
automatically training, based on training data, a candidate model to:
receive input activity data indicative of computing activity;
generate a confidence score indicative of a confidence that the input activity data represents malicious activity;
compare the confidence score to respective alert thresholds corresponding to a plurality of different urgency levels associated with the candidate model, wherein each urgency level is associated with a particular alert channel of a plurality of different alert channels;
select one of the plurality of different urgency levels based on the comparison;
select one of the alert channels based on the selected urgency level;
generate an output that is indicative of a determination that the input activity data represents malicious activity and indicative of the confidence score; and
send an alert representing the output using the selected alert channel;
automatically setting the respective alert thresholds corresponding to the plurality of different urgency levels based on the training data;
identifying a current production model currently deployed by an alert generation computing system in a runtime production environment,
the current production model configured to generate an alert output indicating that activity data represents malicious activity in the runtime production environment and representing a confidence score indicative of a confidence that the activity data represents malicious activity;
generating a current model performance metric that represents performance of the current production model in identifying malicious activity based on test data;
generating a candidate model performance metric that represents performance of the candidate model in identifying malicious activity based on test data;
selecting a best performing model based on the current model performance metric and the candidate model performance metric; and
automatically deploying the best performing model to the alert generation computing system in the runtime production environment.

16. The computer implemented method of claim 15, wherein each given model, of the candidate model and the current production model, is configured to receive the input activity data indicative of the computing activity and generate an output indicative of whether the given model has determined that the input activity data represents given malicious activity and the confidence score indicative of a confidence that the input activity data represents malicious activity, associated with the output, indicative of a confidence that the given model has in the determination that the input activity data represents the given malicious activity.

17. The computer implemented method of claim 15, and further comprising:
setting, for the candidate model, the corresponding alert threshold for each urgency level by identifying a particular confidence score, above which the candidate model generates no more than a first predefined number of false positive outputs that identify input activity test data, that represents benign activity, as representing malicious activity.

18. The computer implemented method of claim 15, and further comprising configuring the candidate model to set the corresponding alert threshold for each given urgency level by:
identifying an allowable number of false positive outputs for the given urgency level; and
identifying a confidence score threshold which produces no more than the allowable number of false positive outputs for the given urgency level based on a binary search of confidence scores.

* * * * *